(No Model.)
P. BERTRAND.
FLOWER STAND.
No. 396,459. Patented Jan. 22, 1889.
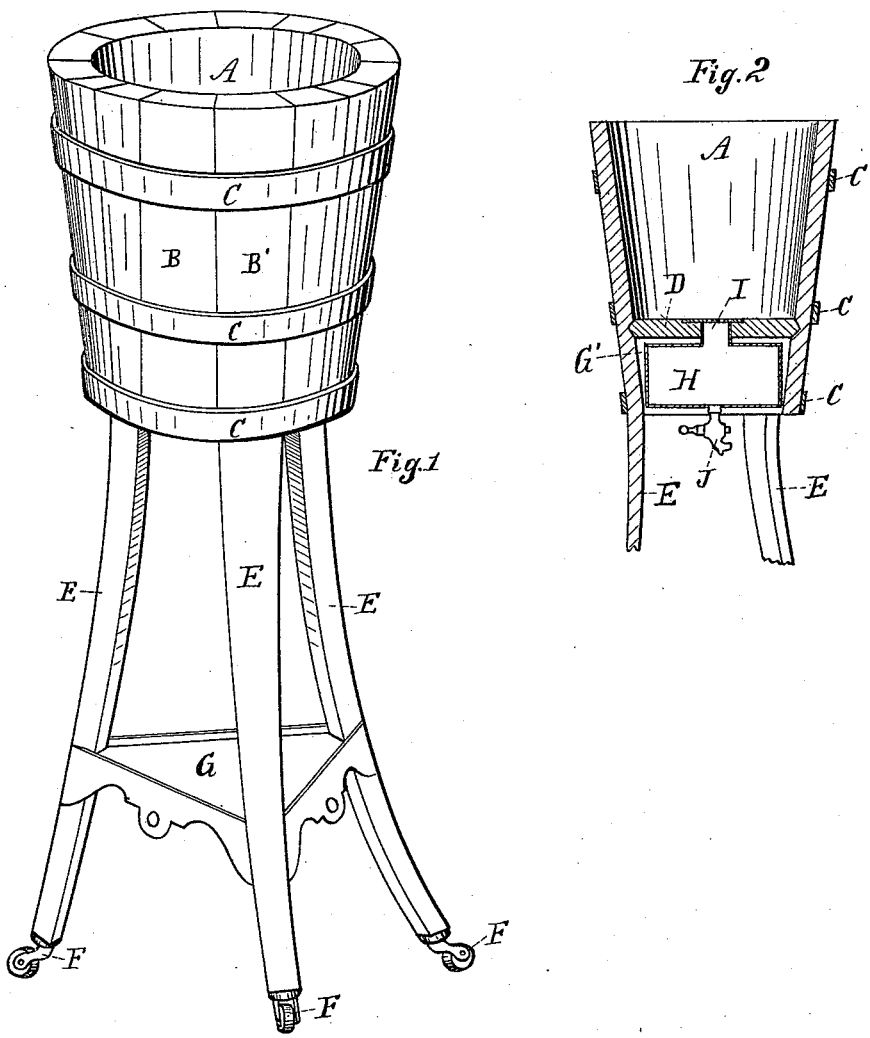
Attest:
John Schuman.
P. M. Hulbert.
Inventor:
Peter Bertrand.
By Thos. S. Sprague & Son
Att'y

UNITED STATES PATENT OFFICE.

PETER BERTRAND, OF SOUTH LYON, MICHIGAN.

FLOWER-STAND.

SPECIFICATION forming part of Letters Patent No. 396,459, dated January 22, 1889.

Application filed June 5, 1888. Serial No. 276,112. (No model.)

*To all whom it may concern:*

Be it known that I, PETER BERTRAND, a citizen of the United States, residing at South Lyon, in the county of Oakland and State of Michigan, have invented certain new and useful Improvements in Flower-Stands, of which the following is a specification, reference being had therein to the accompanying drawings.

This invention relates to new and useful improvements in flower-stands; and my invention consists in the peculiar construction and arrangement of the parts, all as more fully hereinafter described, and shown in the accompanying drawings, in which—

Figure 1 is a perspective view, and Fig. 2 a vertical central section thereof.

A is a flower-pot constructed of a series of staves, B B', held together by suitable hoops, C, and provided with a bottom, D. The staves B' are made of greater length than the staves B, and projecting below the flower-pot are bent outwardly in a graceful curve to form supporting-legs E for the flower-pot, by means of which the flower-pot is provided with a stand of the ordinary height of such stands.

The legs are preferably provided, as usual in such flower-stands, with casters F, and a shelf, G, is arranged between the legs, at the lower end thereof, which completes the finished appearance of the flower-stand, and at the same time forms a brace to keep the legs in their outwardly-curved position against the natural tendency of the wood to straighten.

The shorter staves, B, project a certain distance beyond the bottom D to form, in connection with the staves B', a chamber, G', below the bottom of the flower-pot, within which I intend to conceal a vessel, H, which communicates with the bottom of the pot through the drainage-hole I, in order to receive the drainage of water and collect it therein to prevent the carpets from being wetted or soiled. The staves being inclined, as shown, their lower ends constitute a support for the vessel H.

By means of a little faucet, J, in the bottom of such vessel the water may then be drawn off when desired.

The drainage-hole I is preferably protected with a screen placed above it to prevent the earth from being washed into the drainage-vessel.

The plants may be planted in the pot, or, as usual with flower-stands, may be placed therein in their ordinary pots.

The whole construction may be given a very pleasing appearance by the use of polished metallic hoops and by high finish imparted to the wood.

What I claim as my invention is—

The flower-stand described, composed of the inclined staves of unequal length, the longer staves bent outwardly at their lower ends, forming legs for the stand, the bottom D, arranged above the lower end of the shorter staves, leaving a chamber, G', below the bottom D, and the vessel H, concealed within said chamber and supported by the lower ends of the shorter staves, substantially as shown and described.

In testimony whereof I affix my signature, in presence of two witnesses, this 23d day of May, 1888.

PETER BERTRAND.

Witnesses:
P. M. HULBERT,
JOHN SCHUMAN.